US011073391B2

(12) United States Patent
Stewart (10) Patent No.: US 11,073,391 B2
(45) Date of Patent: Jul. 27, 2021

(54) CORIOLIS VIBRATORY ACCELEROMETER SYSTEM

(71) Applicant: Robert E. Stewart, Woodland Hills, CA (US)

(72) Inventor: Robert E. Stewart, Woodland Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 153 days.

(21) Appl. No.: 16/584,332

(22) Filed: Sep. 26, 2019

(65) Prior Publication Data

US 2021/0095962 A1   Apr. 1, 2021

(51) Int. Cl.
*G01C 19/5733* (2012.01)
*G01C 19/5726* (2012.01)
*G01P 15/125* (2006.01)

(52) U.S. Cl.
CPC ..... *G01C 19/5733* (2013.01); *G01C 19/5726* (2013.01); *G01P 15/125* (2013.01)

(58) Field of Classification Search
CPC ............ G01C 19/5719; G01C 19/5726; G01C 19/5733; G01C 19/5769; G01C 19/5776; G01C 19/5783; G01P 15/125; G01P 15/097
See application file for complete search history.

(56) References Cited

U.S. PATENT DOCUMENTS

| | | |
|---|---|---|
| 5,168,756 A | 12/1992 | Hulsing, II |
| 5,712,426 A | 1/1998 | Sapuppo et al. |
| 7,621,184 B2 | 11/2009 | Caron |
| 7,637,157 B2 | 12/2009 | Chikovani et al. |
| 7,874,209 B2 | 1/2011 | Stewart |
| 8,117,915 B1 | 2/2012 | Cardarelli |
| 8,205,495 B2 | 6/2012 | Challoner |

(Continued)

FOREIGN PATENT DOCUMENTS

EP   2697607 A1   2/2014

OTHER PUBLICATIONS

Non Final Office Action for U.S. Appl. No. 16/249,478 dated Nov. 17, 2020.

(Continued)

*Primary Examiner* — Benjamin R Schmitt
(74) *Attorney, Agent, or Firm* — Tarolli, Sundheim, Covell & Tummino LLP (57) ABSTRACT

A CVA system includes a sensor system including a pendulous element that rotates about a first axis via first flexures in response to an input acceleration provided along a second axis that is orthogonal with respect to the first axis. A torque-summing gimbal is coupled to the pendulous element via the first flexures and coupled to a housing via second flexures. The system further includes an accelerometer controller that monitors a pickoff signal of the rotation of the pendulous element from a first electrode coupled to the pendulous element and to provide a forcer signal to at least one second electrode coupled to the torque-summing gimbal to force the torque-summing gimbal to rotate about the second axis via the second flexures based on the pickoff signal to provide Coriolis force-rebalance of the pendulous element. The accelerometer controller can determine the input acceleration based on the rotation of the torque-summing gimbal.

20 Claims, 10 Drawing Sheets

(56) References Cited

U.S. PATENT DOCUMENTS

| | | |
|---|---|---|
| 8,763,441 B2 | 7/2014 | Casinovi et al. |
| 9,702,697 B2 | 7/2017 | Stewart et al. |
| 10,228,264 B2 | 3/2019 | Trusov et al. |
| 10,584,967 B2 | 3/2020 | Trusov et al. |
| 2005/0092084 A1 | 5/2005 | Fell et al. |
| 2006/0248953 A1 | 11/2006 | Lynch et al. |
| 2007/0144255 A1 | 6/2007 | Handrich et al. |
| 2009/0158846 A1 | 6/2009 | Lignon et al. |
| 2011/0239763 A1 | 10/2011 | Shkel et al. |
| 2016/0084654 A1 | 3/2016 | Senkal et al. |
| 2017/0153266 A1 | 6/2017 | Dao |
| 2017/0363423 A1 | 12/2017 | Dormody et al. |
| 2018/0017385 A1 | 1/2018 | Shirvani et al. |
| 2018/0156634 A1 | 6/2018 | Trusov |
| 2018/0231383 A1 | 8/2018 | Trusov et al. |
| 2020/0225039 A1 | 7/2020 | Flamm |

OTHER PUBLICATIONS

Kaiser, et al.: "A Micromachined Pendulous Oscillating Gyroscopic Accelerometer"; found on the internet on Sep. 17, 2019 at: http://mems.seas.upenn.edu/publications/2000/A%20Micromachined%20Pendulous%20Oscillating%20Gyroscopic%20Accelerometer.pdf; Solid-State Sensor and Actuator Workshop, Hilton Head Island, South Carolina, Jun. 4-8, 2000, pp. 85-88.

Extended European Search Report for Application No. 20196367.5-1010 dated Feb. 4, 2021.

European Office Action for Application No. 20152073.4-1213 dated Jul. 1, 2020.

FIG. 9

CORIOLIS VIBRATORY ACCELEROMETER SYSTEM

TECHNICAL FIELD

This disclosure relates generally to sensor systems, and specifically to a Coriolis Vibratory Accelerometer (CVA) system.

BACKGROUND

In traditional electromagnetic and electrostatic force-rebalance instruments, such as an accelerometer, instability and non-repeatability of the characteristics of the control electronics are sources of error. For example, the voltages, currents, frequencies, or phases of the control electronics can be potential sources of error that can deleteriously affect the output of a respective electromagnetic and electrostatic force-rebalance instrument (e.g., rotation or acceleration). One example of an accelerometer currently deployed in inertial systems is the Pendulous Integrating Gyroscope Accelerometer (PIGA). The PIGA incorporates gyroscopic precession to force-rebalance to avoid the error sources associated with the characteristics of the control electronics. As a result, the PIGA is typically able to provide an accurate output (e.g., rotation or acceleration).

SUMMARY

A CVA system includes a sensor system including a pendulous element that rotates about a first axis via first flexures in response to an input acceleration provided along a second axis that is orthogonal with respect to the first axis. A torque-summing gimbal is coupled to the pendulous element via the first flexures and coupled to a housing via second flexures. The system further includes an accelerometer controller that monitors a pickoff signal of the rotation of the pendulous element from a first electrode coupled to the pendulous element and to provide a forcer signal to at least one second electrode coupled to the torque-summing gimbal to force the torque-summing gimbal to rotate about the second axis via the second flexures based on the pickoff signal to provide Coriolis force-rebalance of the pendulous element. The accelerometer controller can determine the input acceleration based on the rotation of the torque-summing gimbal.

Another example includes a method for measuring an input acceleration along a sensitive axis via a CVA system. The method includes providing an oscillating-mass forcer signal to at least one first electrode to drive an in-plane oscillatory motion of a plurality of oscillating-masses associated with a pendulous element of a sensor system. The method also includes monitoring a pickoff signal from at least one second electrode to determine a rotation of the pendulous element about a first axis via first flexures in response to an input acceleration provided along a second axis that is orthogonal with respect to the first axis. The method also includes generating a forcer signal based on the pickoff signal. The method also includes providing the forcer signal to at least one third electrode associated with a torque-summing gimbal of the sensor system to force the torque-summing gimbal to rotate in response to the pickoff signal to provide Coriolis force-rebalance of the pendulous element via the rotation of the torque-summing gimbal and the in-plane oscillatory motion of the oscillating-masses. The method further includes determining an input acceleration based on a velocity of the in-plane oscillatory motion of the oscillating-masses and an angular velocity of the rotation of the torque-summing gimbal.

Another example includes a CVA system. The system includes a sensor system. The sensor system includes a pendulous element configured to rotate about a first axis via first flexures in response to an input acceleration provided along a second axis that is orthogonal with respect to the first axis. The sensor system also includes a plurality of oscillating-masses coupled to the pendulous element via second flexures and being configured to oscillate in an in-plane oscillatory motion. The sensor system further includes a torque-summing gimbal coupled to the pendulous element via the first flexures and coupled to a housing via third flexures. The CVA system also includes an accelerometer controller. The accelerometer controller includes an oscillating-mass servo configured to provide an oscillating-mass forcer signal to at least one first electrode associated with the plurality of oscillating-masses to provide the in-plane oscillatory motion. The accelerometer controller also includes an angular rate servo configured to monitor a pickoff signal associated with the rotation of the pendulous element from at least one second electrode coupled to the pendulous element. The accelerometer controller also includes an acceleration rebalance servo configured to provide a forcer signal to at least one third electrode coupled to the torque-summing gimbal to force the torque-summing gimbal to rotate about the third flexures based on the pickoff signal to provide Coriolis force-rebalance of the pendulous element in response to the rotation of the torque-summing and the in-plane oscillatory motion of the oscillating masses. The accelerometer controller further includes an optical velocity detector configured to determine a velocity of the plurality of oscillating-masses and to determine an angular velocity of the torque-summing gimbal. The acceleration controller is configured to determine the input acceleration based on the velocity of the plurality of oscillating-masses and the angular velocity of the torque-summing gimbal.

DETAILED DESCRIPTION

This disclosure relates generally to sensor systems, and specifically to a Coriolis Vibratory Accelerometer (CVA) system. The CVA includes a sensor system and an accelerometer controller. The sensor system includes a pendulous element and a torque-summing gimbal. The pendulous element can have a set of flexures that are offset from a center of gravity of the sensor system to provide pendulosity of the pendulous element in response to an input acceleration along an input axis. As a result, the pendulous element can rotate about an axis orthogonal with the input acceleration via the flexures. The rotation of the pendulous element can be determined via a capacitive pickoff signal between a set of electrodes associated with the pendulous element and a corresponding set of electrodes coupled to a housing. The pickoff signal can thus correspond to the rotation of the pendulous element in response to the input acceleration. The pendulous element can also include a set of oscillating-masses that are provided a forcer signal to a corresponding set of electrodes to provide for an oscillatory motion of the oscillating-masses.

The torque-summing gimbal can be coupled to the pendulous element via a set of flexures, such as on-axis with respect to the input axis of the pendulous element to mitigate rotation of the torque-summing gimbal in response to input accelerations along an axis in the plane of the pendulous element and orthogonal to the input axis. The flexures supporting the torque summing gimbal can occupy the same plane as the combined center of mass of the pendulous element and torque summing gimbal. In this configuration, there may be no pendulosity and no rotation of the pendulous element and torque summing gimbal in response to acceleration along the orthogonal axis.

The torque-summing gimbal can be forced to oscillate about an axis (e.g., the axis associated with the input acceleration) orthogonal to the axis of rotation of the pendulous element. For example, in response to the pickoff signal associated with the pendulous element, the accelerometer controller can generate a forcer signal that is provided to a set of electrodes associated with the torque-summing gimbal to force the torque-summing gimbal to rotate about the axis. Therefore, in response to the in-plane oscillatory motion of the oscillating masses, and in response to the rotation of the torque-summing gimbal, such as in an oscillatory manner at a frequency that is the same as the in-plane oscillatory motion of the oscillating masses, the torque-summing gimbal can generate Coriolis accelerations on the respective oscillating masses that are configured to torque-rebalance the pendulous mass from the rotation caused by the input acceleration. In addition, the accelerometer controller can include a velocity detection component that is configured to determine a velocity of the oscillating-masses and an angular velocity of the torque-summing gimbal. As a result, the accelerometer controller can be configured to calculate an amplitude and polarity of the input acceleration in response to the determination of the velocity of the oscillating-masses and the angular velocity of the torque-summing gimbal.

Figure 1:
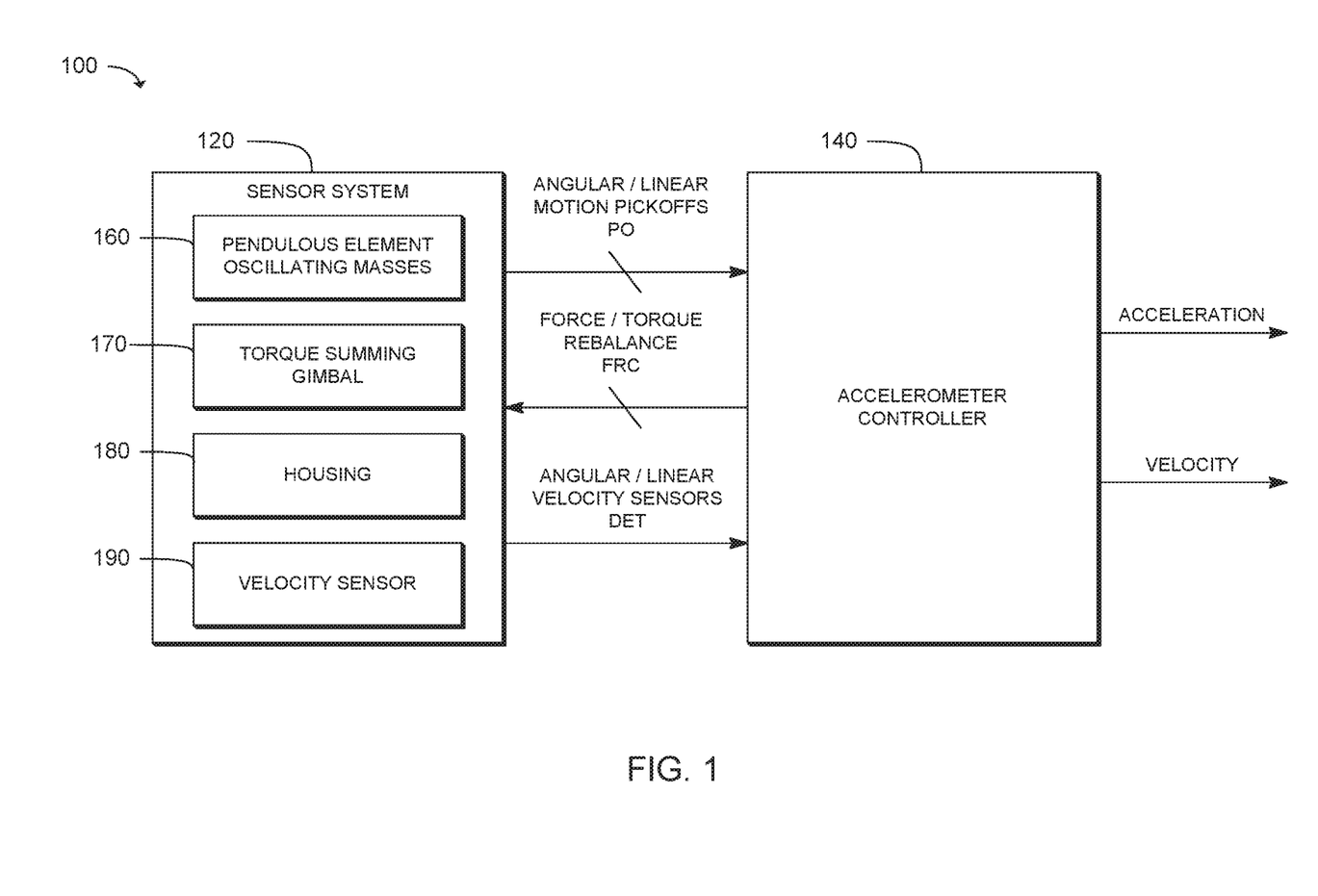
FIG. 1 illustrates an example of a Coriolis Vibratory Accelerometer (CVA) system.

FIG. 1 illustrates an example of a Coriolis Vibratory Accelerometer (CVA) system 100. The CVA system 100 can be implemented in any of a variety of applications with which accurate measurement of acceleration may be necessary, such as aviation, marine, or aerospace navigation. The CVA system 100 includes a sensor system 120 and an accelerometer controller 140.

The sensor system 120 can be arranged in any of a variety of different physical configurations. In the example of FIG. 1, the sensor system 120 includes a pendulous element 160, a torque-summing gimbal 170, a housing 180, and velocity sensors 190. The pendulous element 160 can include a set of flexures that occupy a plane that is offset from a center of gravity of the sensor system 120, such that the pendulous element 160 can have pendulosity in response to an input acceleration along a first axis. As a result, the pendulous element 160 can be configured to rotate via the flexures in response to the input acceleration. As an example, the pendulous element 160 can include a set of electrodes that capacitively interact with a set of electrodes associated with the housing 180, such that the rotation of the pendulous element 160 can be determined via a capacitive pickoff signal PO. In the example of FIG. 1, the pickoff signals that are provided to the accelerometer controller 140 are demonstrated generally as a set of signals PO.

As an example, the pendulous element 160 can include a plurality of oscillating-masses that are driven via a first forcer signal (e.g., generated by the accelerometer controller 140) applied to a set of electrodes to provide an in-plane oscillatory motion of the oscillating-masses. In the example of FIG. 1, the forcer signals that are generated via the accelerometer controller 140 are demonstrated generally as a set of forcer signals FRC. For example, the oscillating-masses can include a pair or multiple pairs of oscillating-masses that oscillate concurrently in anti-parallel directions. For example, the in-plane oscillatory motion can be substantially in-plane with the pendulous element 160. As another example, the pendulous element 160 can be coupled to the torque-summing gimbal 180 via a set of flexures, such that the torque-summing gimbal 180 can have an approximately concentric arrangement with respect to the pendulous element 160. For example, the torque-summing gimbal 180 can be coupled to the housing 200 via another set of flexures, such as arranged in-plane with a center of mass of the sensor system 120 that can have an axis of rotation that is orthogonal with respect to the flexures associated with the pendulous element 160. As an example, the accelerometer controller 140 can also be configured to generate a forcer signal FRC based on the pickoff signal PO provided from the pendulous element 160. The forcer signal FRC can be provided to the torque-summing gimbal 180 via a set of electrodes coupled to the torque-summing gimbal 180 and to the housing 200 to force the rotation of the torque-summing gimbal 180 in response to the pickoff signal PO.

As described in greater detail herein, the accelerometer controller 140 can be configured to determine the input acceleration based on the angular velocity of the rotation of the torque-summing gimbal 170 and the velocity of the oscillatory motion of the oscillating-masses within the pendulous element 160. As described herein, the term "rotate" and "rotation" with respect to the torque-summing gimbal 170 can refer to a forced oscillation of the torque-summing gimbal 170 about the first axis (e.g., corresponding to the input axis or sensitive axis). The rotation of the torque-summing gimbal 170 can therefore correspond to an angular rotation of the torque-summing gimbal 170 in one of two angular directions between which the torque-summing gimbal 170 is forced to oscillate. The angular velocity of the rotation in either of the two angular directions during the forced oscillation of the torque-summing gimbal 170 can be used along with the velocity of the oscillating masses to determine the input acceleration via the accelerometer controller 140, as described in greater detail herein.

As an example, the accelerometer controller 170 can include a detection system (e.g., an optical detection system) that is configured to determine the velocity (e.g., angular velocity) of rotation of the torque-summing gimbal 170 and the linear velocity of the oscillating masses within the pendulous element. The detection is demonstrated in the example of FIG. 1 by a signal DET that can be associated with the determination of the velocity (e.g., angular velocity) of the torque-summing gimbal 170 and can also include an indication of the velocity of the oscillating-masses. For example, the sensor system 120 can include an optical detection system that can be configured to determine the velocity of the torque-summing gimbal 170 and the velocity of the oscillating-masses. As a result, the accelerometer controller 140 can calculate the input acceleration based on the velocity of the torque-summing gimbal 170 and the velocity of the oscillating-masses.

Figure 2:
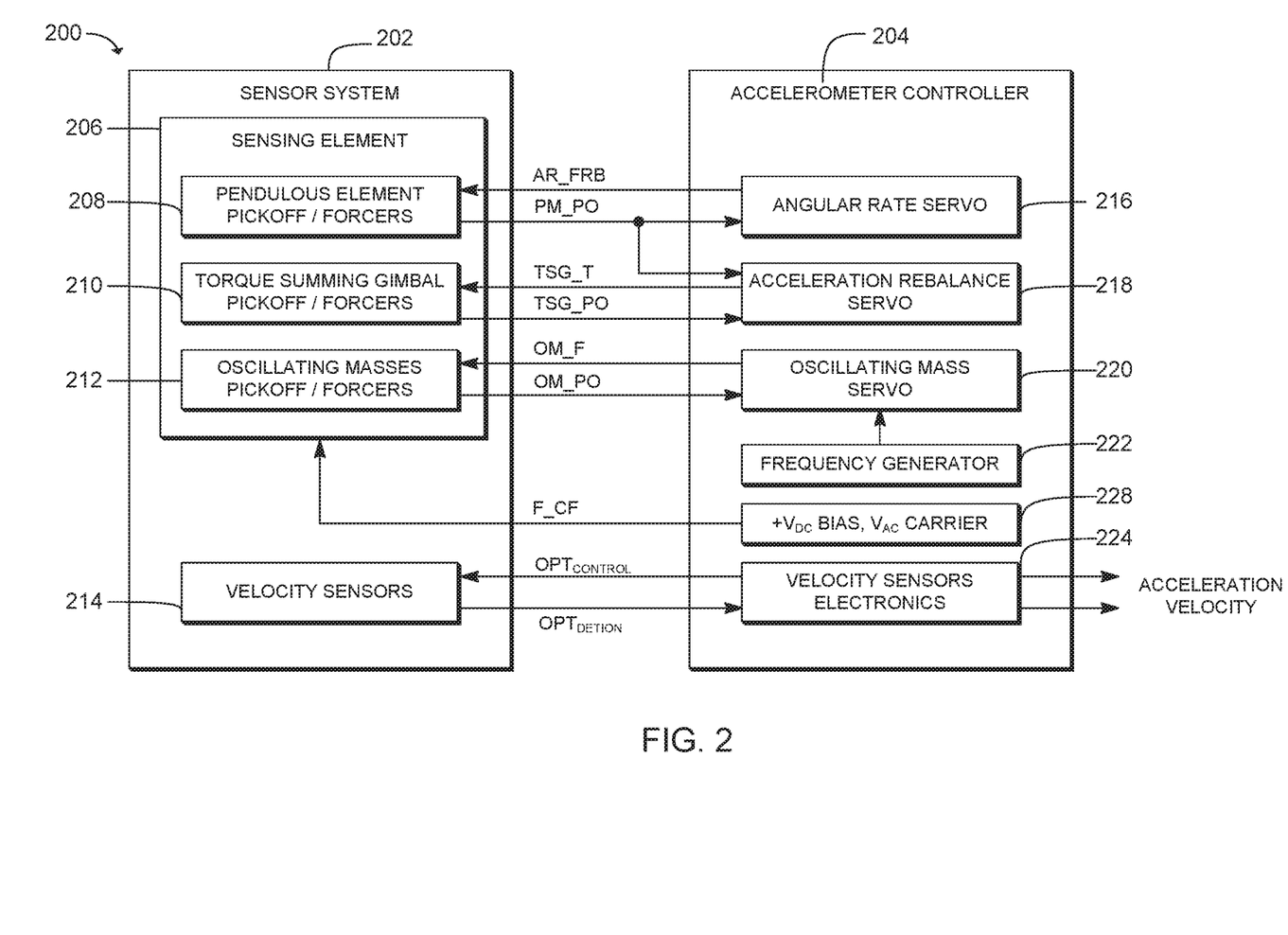
FIG. 2 illustrates another example of a CVA system.
Figure 3:
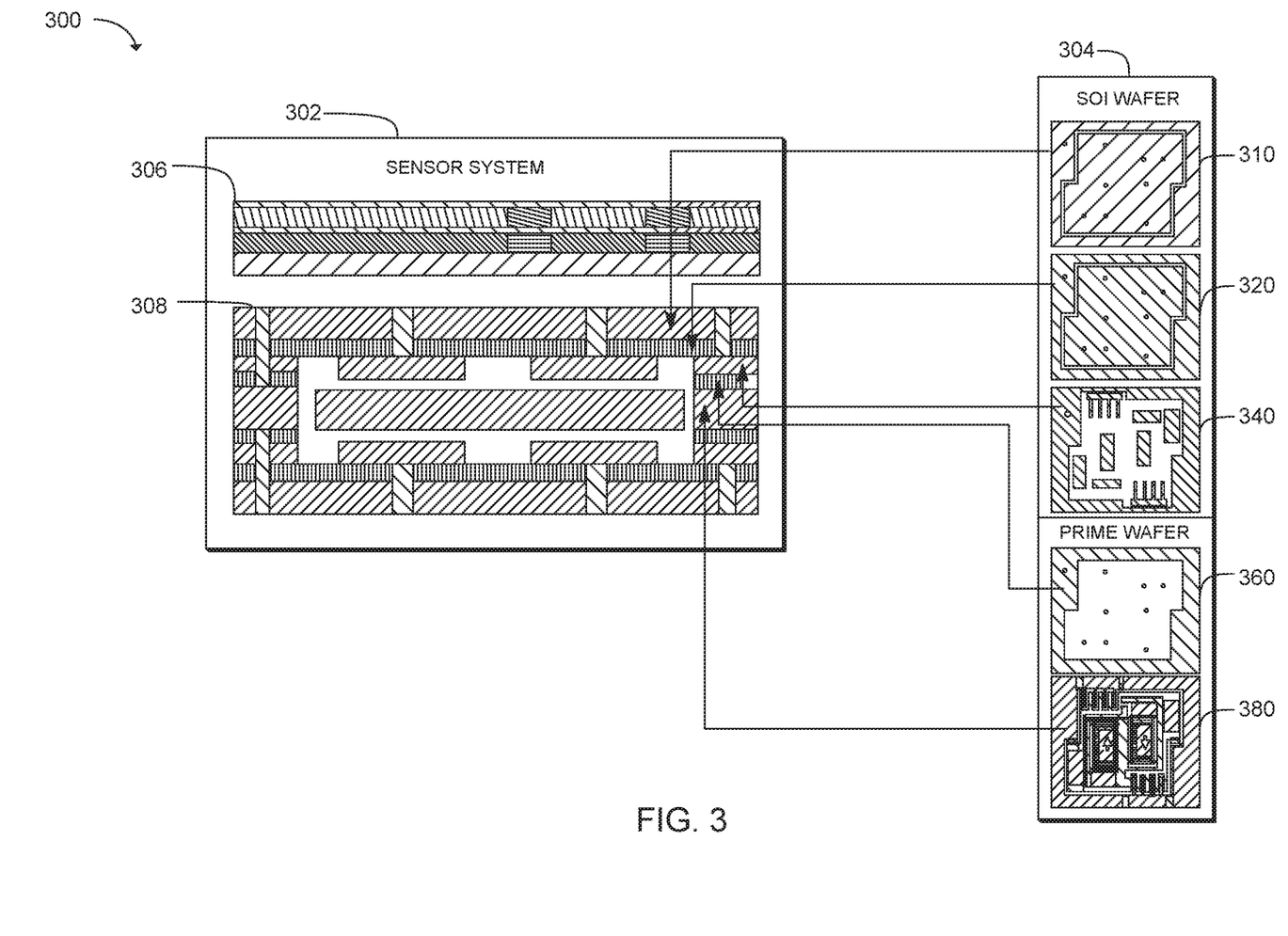
FIG. 3 illustrates an example of a sensor system.
Figure 4:
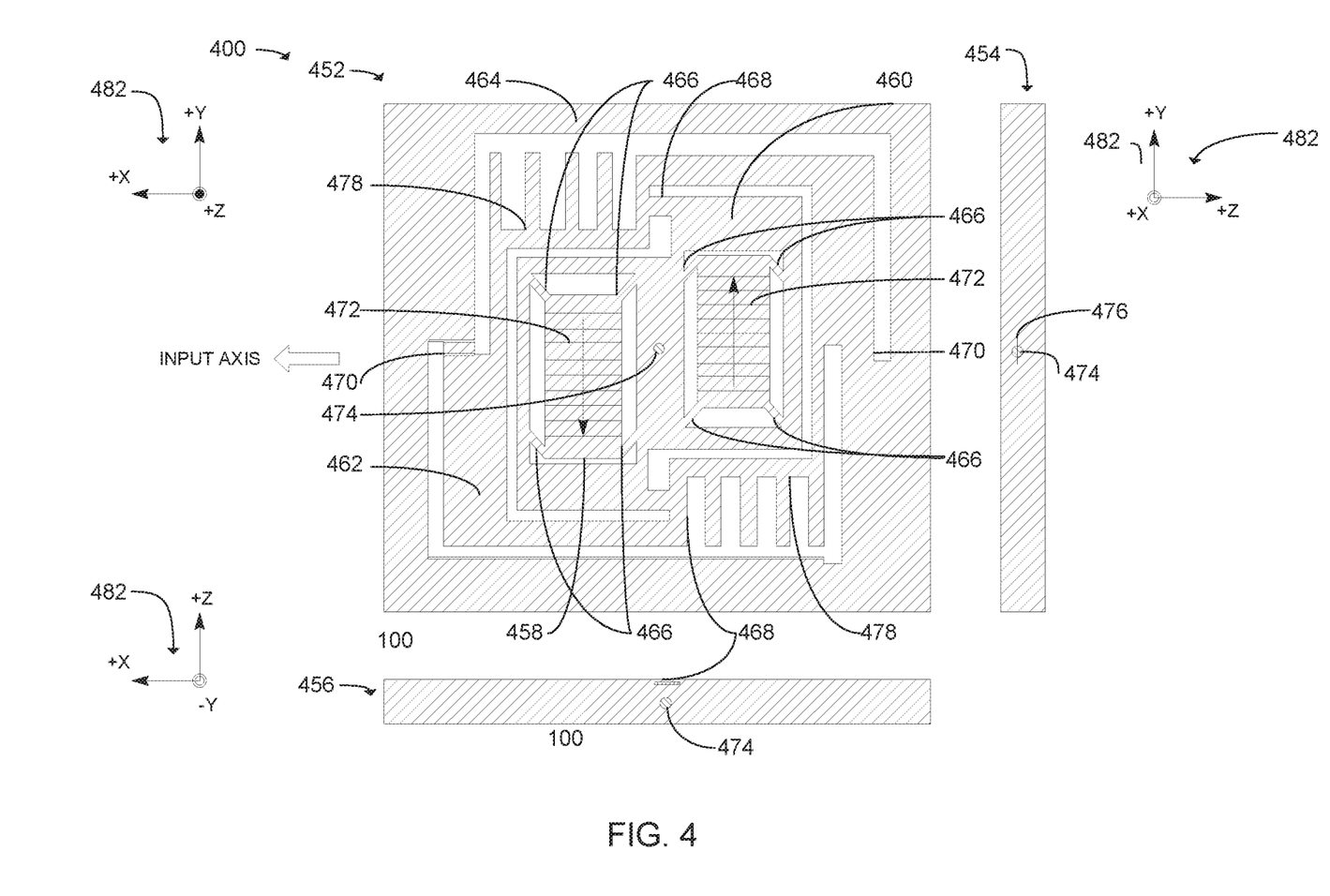
FIG. 4 illustrates an example of a sensing element.
Figure 5:
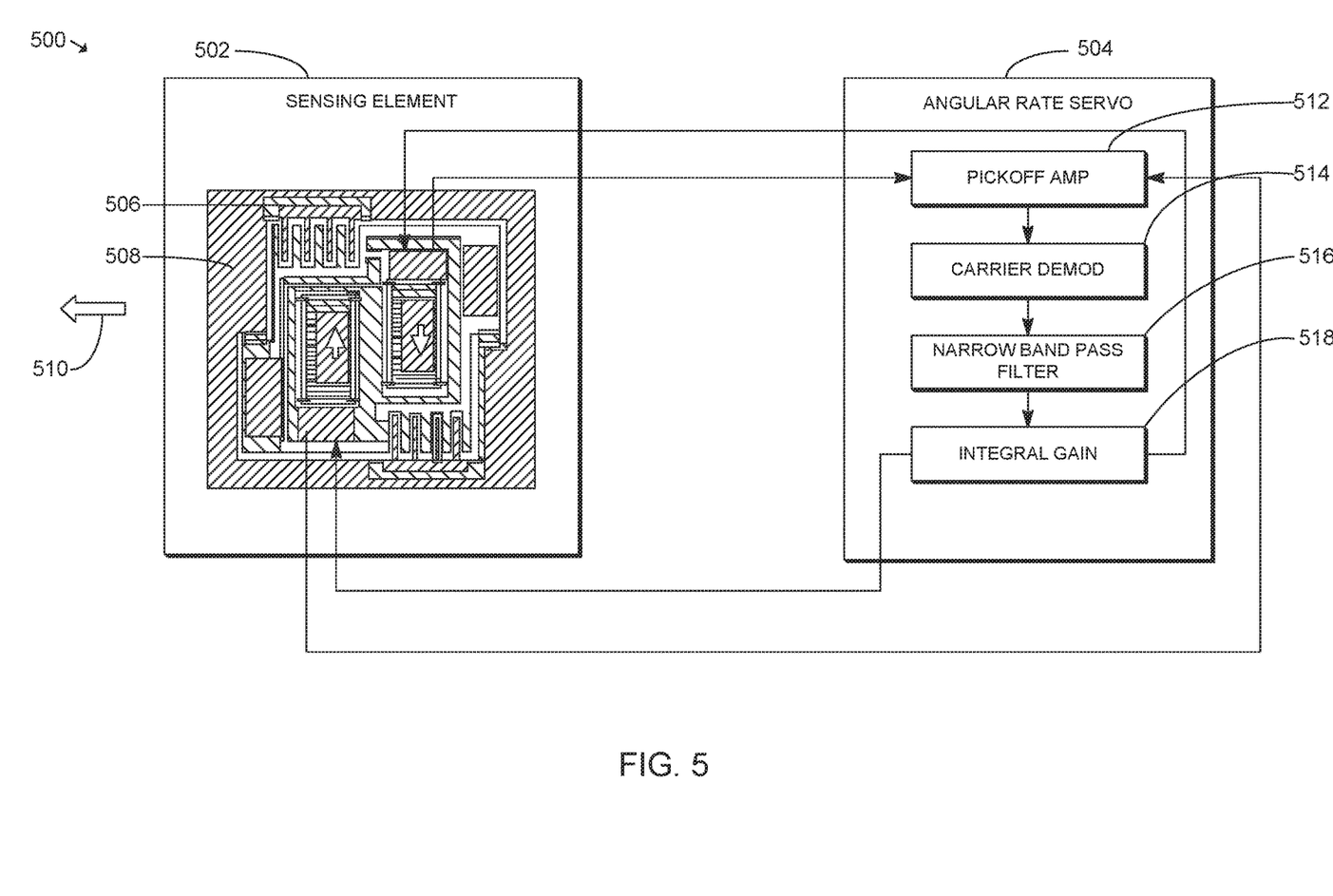
FIG. 5 illustrates an example of an angular rate servo system.
Figure 6:
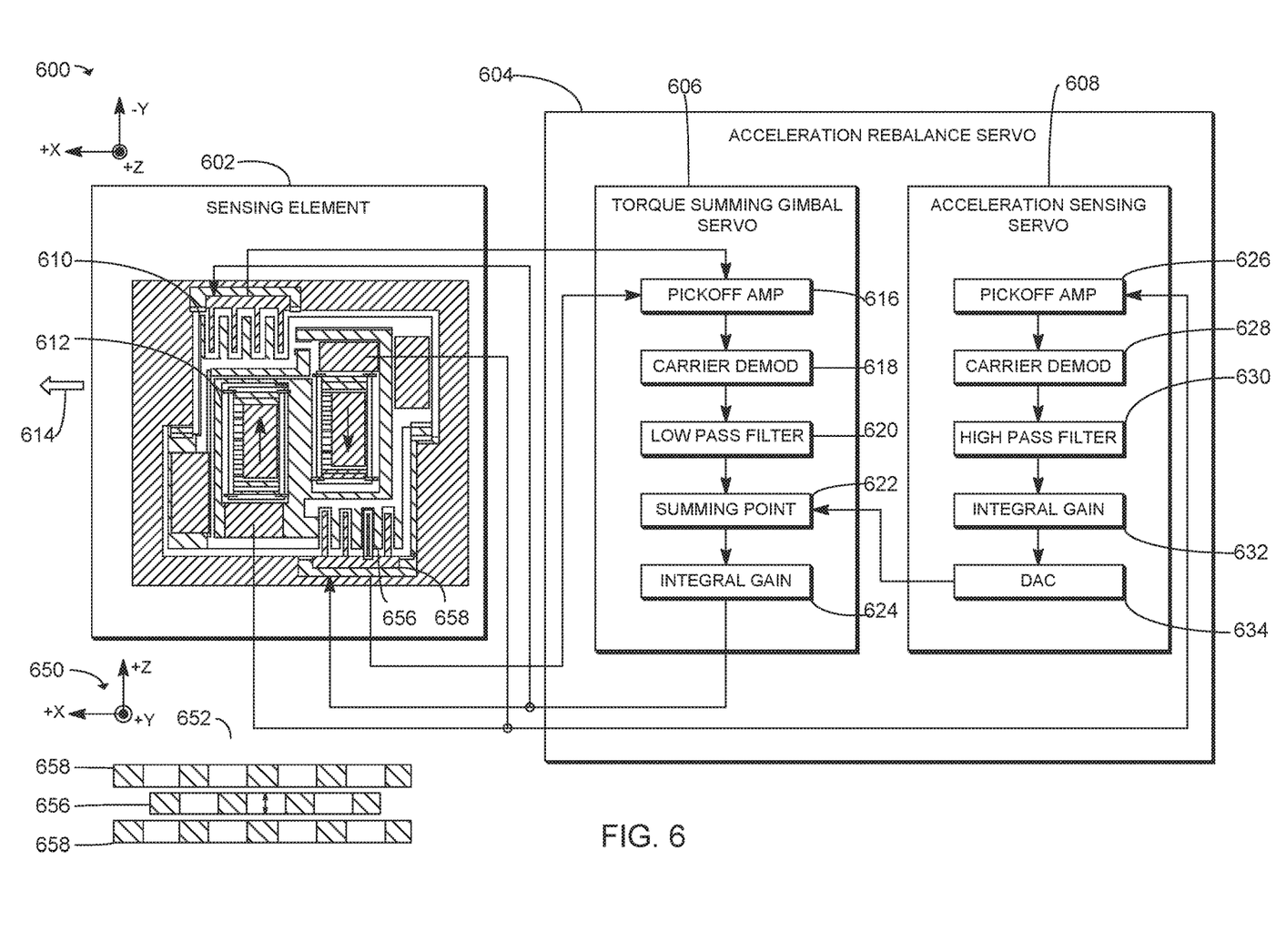
FIG. 6 illustrates an example diagram of torque-summing gimbal electrodes.

FIG. 2 illustrates another example of a CVA system 200, FIG. 3 illustrates an example of a sensor system 300, FIG. 4 illustrates an example of a sensing element 400, FIG. 5 illustrates an example of an angular rate servo system 500, and FIG. 6 illustrates an example of an acceleration rebalance servo system 600. The CVA system 200 can correspond to the CVA system 100 in the example of FIG. 1. Therefore, reference is made to the example of FIG. 1 in the following description of the examples of FIGS. 2-6. The CVA system 200 can be implemented in any of a variety of applications with which accurate measurement of acceleration may be necessary, such as aviation, marine, or aerospace navigation. The CVA system 200 includes a sensor system 202 and an accelerometer controller 204.

The sensor system 202 can be arranged in any of a variety of different physical configurations. In the example of FIG. 2, the sensor system 202 includes a sensing element 201. The sensing element 201 includes a set of pendulous element pickoff/forcers electrodes 208, a set of torque summing gimbal pickoff/forcer electrodes 210, a set of oscillating-masses pickoff/forcer electrodes 212, and a set of optical velocity sensors 214. As an example, the set of electrodes 212 can correspond to the electrodes coupled to the housing 464 that interact with the electrodes 472 in the example of FIG. 4. Similarly, the PM_PO electrodes 206 can correspond to electrodes coupled to the housing 464 that interact with the substantially planar electrodes 460 in the example of FIG. 4, and the CF electrodes 208 can correspond to the electrodes coupled to the housing 464 that interact with the electrodes 478 (e.g., the second set of electrodes 658 in the example of FIG. 6).

The accelerometer controller 204 includes an angular rate servo 216 that is configured to provide one or more force-rebalance signals AR_FRB to the PO/F electrodes 208 and receives one or more pickoff signals PM_PO from the PO/F electrodes 206. For example, the force-rebalance signal(s) AR_FRB and the pickoff signal(s) PM_PO can correspond to a portion of the forcer signals FRC and the pickoff signals PO in the example of FIG. 1, respectively. Therefore, the pickoff signal(s) PM_PO can correspond to the pendulous element 160 in the example of FIG. 1. In response to the pickoff signal(s) PM_PO, the angular rate servo 216 is configured to generate the force-rebalance signal(s) AR_FRB to substantially null the position of the pendulous element 160 in response to the oscillation of the pendulous element 160 (e.g., in response to the angular rate input as described herein). Additionally, the amplitude of the force-rebalance signal(s) AR_FRB can be implemented by the accelerometer controller 204 to determine an angular rate of rotation of the sensor system 202, such as about the input axis. (e.g., the X-axis in the example of FIG. 4). For example, the angular rate servo 216 can be configured to demodulate an oscillation frequency corresponding to the oscillation of the pendulous element 160 resulting from angular rate to generate the force-rebalance signal(s) AR_FRB.

The accelerometer controller 204 also includes an oscillating-mass servo 220 that is configured to provide one or more forcer signals OM_F to the electrodes 212 associated with the oscillating-masses 212 and receives one or more pickoff signals OM_PO from the electrodes 212. For example, the forcer signal(s) OM_F and the pickoff signal(s) OM_PO can correspond to a portion of the forcer signals FRC and the pickoff signals PO in the example of FIG. 1, respectively. As an example, the forcer signal(s) OM_F can be provided to the electrodes 212 to provide for the in-plane oscillatory motion of the oscillating-masses 212, and the pickoff signal(s) OM_V can be indicative of the oscillatory motion of the oscillating-masses 212. In the example of FIG. 2, the accelerometer controller 204 also includes a frequency generator 222 that is configured to provide a control frequency signal F_CF to the oscillating-masses 212 such as in a kilohertz range. A +Vdc bias voltage and a Vac carrier signal is applied to the sensing element by the bias voltage and carrier signal generator 228. The bias voltage and the carrier signal are used by all capacitive pickoff and electrostatic forcers.

Referring to the example of FIG. 3, the sensor system 300 can correspond to the sensor system 120 in the example of FIG. 1. Therefore, reference is made to the example of FIG. 1 in the description of the following description of the example of FIG. 3. The sensor system 300 is demonstrated in the example of FIG. 3 by example, and is not intended to be limited with respect to physical arrangement. Thus, the sensor system 300 can be physically arranged and fabricated in a variety of different ways. For example, the sensor system can be fabricated and assembled using MEMS technology. As an example, the sensor system 300 may be comprised of an integrated optic chip 306 and MEMS sensor 308. The individual layers of the MEMS sensor are illustrated in FIG. 3. The top and bottom SOI wafers (e.g., only the top wafer is illustrated in the example of FIG. 3) are comprised of a handle layer 310, a buried oxide layer 320, and a device layer 340. The device layer 340 contains the pickoff and forcer electrodes illustrated in the sensing element 201 in the example of FIG. 2. The center layer is fabricated from a prime silicon wafer 350 and a deposited oxide layer 360 that determines the capacitive gap for the pickoffs and forcers.

Referring to the example of FIG. 4, the sensing element 400 can correspond to the sensing element 206 in the example of FIG. 2. The sensor system 400 is demonstrated in the example of FIG. 4 by example and is not intended to be limited with respect to the physical arrangement. Thus, the sensor system 400 can be physically arranged and fabricated in a variety of different ways, such as illustrated in FIG. 3.

The sensor system 400 includes three separate views, demonstrated in the example of FIG. 4 as a first view 452, a second view 454, and a third view 456 with respect to a three-dimensional Cartesian coordinate system 482. Therefore, the first view 452 corresponds to a "front" or "top" view, while the second view 454 and third view 456 each correspond to "side" views. The sensor system 400 includes a pair of oscillating-masses 458, a pendulous element 460, and a torque-summing gimbal 462 that are coupled to a housing frame 464 and which are arranged in a substantially concentric arrangement with respect to each other. The housing frame 464 is demonstrated as substantially surrounding the oscillating-masses 458 and the pendulous element 460. A separate portion of the housing 464 covers the torque-summing gimbal 462 and the frame 464. However, the housing 464 can also include planar portions that are "above" and "below" the oscillating-masses 458, the pendulous element 460, and the torque-summing gimbal 462 in XY-planes that are offset from the oscillating-masses 458, the pendulous element 460, and the torque-summing gimbal 462 along the Z-axis. For example, the housing 464 can include electrodes to interact with the oscillating-masses 458, the pendulous element 460, and the torque-summing gimbal 462, as described in greater detail herein.

In the example of FIG. 4, the oscillating-masses 458 are coupled to the pendulous element 460 via a set of flexures 466, the pendulous element 460 is coupled to the torque-summing gimbal 462 via a set of flexures 468, and the torque-summing gimbal 462 is coupled to the housing 464 via a set of flexures 470. The flexures 466 are arranged to provide for an anti-parallel oscillatory motion of the oscillating-masses 458 that is in-plane with respect to the opposing surfaces of the pendulous element 460 (e.g., in the XY-plane in a neutral position of the pendulous element 460). In the example of FIG. 4, the oscillating-masses 458 include electrodes 472 extending from at least one of the planar surfaces (e.g., the XY-plane), such that the electrodes 472 are arranged in a "tooth" drive arrangement, as described in greater detail herein.

An example of the anti-parallel oscillatory motion of the oscillating-masses 458 is demonstrated in the example of FIG. 4. As demonstrated in the example of FIG. 4, the oscillating-masses 458 are driven with substantially equal velocity and are driven oppositely with respect to the in-plane oscillatory motion. The example of FIG. 4 demonstrates one phase, such that an opposite phase occurs in which the oscillating-masses 458 switch directions and are moved to opposite extreme locations via the electrodes 472. Thus, the oscillating-masses 458 are driven with controlled velocity by the accelerometer controller 204 between opposite respective extreme locations in-plane with the pendulous element 460.

In the example of FIG. 4, the flexures 468 are arranged along the Y-axis to provide for rotation of the pendulous element 460 about the Y-axis. As demonstrated in the third view 456, the flexures 468 are arranged in a plane that is offset from a center of gravity 474 of the sensing element 400. As a result, in response to an input acceleration provided along the X-axis corresponding to a sensitive axis of the sensor system 202, the pendulous element 460 can exhibit pendulosity to provide for a rotation of the pendulous element 460 about the flexures 468. The pendulous element 460 includes electrodes 476, demonstrated as "PO/F ELECTRODES", that are arranged on the surface of the pendulous element 460 in the XY-plane on opposite extreme portions of the pendulous element 460 with respect to the rotation about the flexures 468. As an example, the pendulous element 460 can include the electrodes 476 on each of the opposite XY-planar surfaces. In response to the rotation of the pendulous element 460, the electrodes 476 can capacitively react with electrodes coupled to opposing surfaces of the housing (not shown in the example of FIG. 4) to provide a capacitive pickoff signal (e.g., corresponding to the pickoff signal PO in the example of FIG. 1). Therefore, the accelerometer controller 140 can be provided an indication of the rotation of the pendulous element 460 about the flexures 468 via the pickoff signal PO.

The flexures 470 are arranged along the X-axis to provide for rotation of the torque-summing gimbal 462 about the X-axis. As demonstrated in the second view 454, the flexures 470 are arranged in-plane with the center of gravity 474 of the sensing element 400 to minimize pendulosity of the torque-summing gimbal 462 and minimize rotation of the torque summing gimbal in response to acceleration along the Y-axis. The torque-summing gimbal 462 includes electrodes 478, demonstrated as "CF ELECTRODES", arranged as "fingers" integral with the torque-summing gimbal 462 in the XY-plane on opposite portions of an approximate XY-vector (e.g., +X, +Y and −X, −Y) of the torque-summing gimbal 462. In response to forcer signals FRC provided to the electrodes 658 in FIG. 6, the torque-summing gimbal 462 can rotate (e.g., oscillate) about the X-axis. For example, the forcer signals FRC can be generated by the accelerometer controller 140 based on the pickoff signal PO provided in response to the rotation of the pendulous element 460. The forcer signals FRC can thus force the torque-summing gimbal 462 to oscillate, thus generating Coriolis accelerations on the oscillating masses resulting in a torque to rebalance the pendulous element 460 and thereby null the pendulous element pickoff.

The example of FIG. 4 demonstrates an example of the electrodes 478. The example of FIG. 5 demonstrates a window 502 corresponding to the example of FIG. 4. FIG. 6 illustrates an example diagram 650 of torque-summing gimbal electrodes. The diagram 650 includes a view 652 of the torque-summing gimbal electrodes (e.g., demonstrated as a cross-sectional view of the sensing element 400 in the example of FIG. 4).

In the example of FIG. 6, the torque-summing gimbal electrodes include a first set of electrodes 656 and corresponding second sets of electrodes 658. The first set of electrodes 656 can correspond to the electrodes 478 in FIG. 4 that are integral to the torque-summing gimbal 462, and the second sets of electrodes 490 can correspond to sets of electrodes that are coupled to the housing 464. As demonstrated in the example of FIG. 6, the sets of electrodes 656 and 658 are demonstrated as being interdigitated with each other in an out-of-plane "comb" drive configuration. As a result, the force-rebalance signal FRC that is provided to the second set of electrodes 658 can electrostatically force the first set of electrodes 656 of the torque-summing gimbal 462 to rotate (e.g. oscillate).

Referring to the example of FIG. 5, the angular rate servo system 500 includes a sensing element 502 and an angular rate servo 504. The sensing element 502 includes a pendulous element that can correspond to the pendulous element 460 in FIG. 4. The angular rate servo system also includes an angular rate servo 504 that can correspond to the angular rate servo 216 in FIG. 2. The angular rate servo 504 includes a pickoff amplifier 512, a carrier demodulator 514, a narrow bandpass filter 516 and an integral gain amplifier 518. The angular rate servo nulls the angular oscillation of the pendulous element at the oscillating masses frequency due to angular rate about the input axis of the sensor system 200 in FIG. 1. The cancelation of the oscillation of the pendulous element by the angular rate servo eliminates this error source in the measurement of the velocity of the oscillating masses, The force-rebalance signal of the angular rate servo may be used as an estimate of the angular rate about the sensing element's input axis 510

Referring to the example of FIG. 6, the acceleration rebalance servo system includes a sensing element 602 and an acceleration rebalance servo 604. The sensing element 602 includes pendulous element 612 that can correspond to pendulous element 460 in FIG. 4 and a torque summing gimbal 610 that can correspond to the torque summing gimbal 462 in FIG. 4. The acceleration rebalance servo system also includes an acceleration rebalance servo 604 that can correspond to the acceleration rebalance servo 218 in FIG. 2. The acceleration rebalance servo 604 includes a torque summing gimbal servo 606 and an acceleration sensing servo 608. The torque summing gimbal servo 606 includes a pickoff amplifier 616, a carrier demodulator 618, a low pass filter 620, a summing point 622, and an integral gain amplifier 624. The elements 616, 618, 620, 622 and 624 of the torque summing gimbal servo, restricts the torque summing gimbal's rotation (e.g. oscillating) to respond only to an offset (e.g., slew) signal applied to the summing point 622 by the acceleration sensing servo 608, and a digital-to-analog converter (DAC) 634. The acceleration rebalance servo 604 also includes an acceleration sensing servo 608. The acceleration sensing servo includes a pickoff amplifier 626, a carrier demodulator 628, a high pass filter 630, an integral gain amplifier 632 and a DAC 634. The elements 626, 628, 630, 632 and 634 of the acceleration rebalance servo force the torque summing gimbal 610 to rotate (e.g. oscillate) in response to rotation of the pendulous element 612 in response to acceleration along the input axis of the sensing system 200 in FIG. 1.

As an example, the acceleration controller 204 can be configured to determine the input acceleration a based on a CVA torque rebalance equation, described as follows:

$$\alpha = (m_2 * L_2) + (m_3 * L_3) * (2 * V_1 * V_2)/(m_1 * L_1) \quad \text{Equation 1}$$

Where: α is the input acceleration;
$m_1$ is the mass of the pendulous element;
$L_1$ is the pendulous arm of the pendulous element;
$m_2$ and $m_3$ correspond to masses of the oscillating masses;
$L_2$ and $L_3$ correspond to the lever arms of the oscillating masses, respectively;
Φ is the angular displacement of the torque-summing gimbal;
x is the linear displacement of the oscillating masses;
$V_1 = d\Phi/dt$ is the angular velocity of the torque-summing gimbal;
$V_2 = dx/dt$ is the linear velocity of the oscillating masses, such that $(2*V_1*V_2)$ corresponds to the Coriolis acceleration on the oscillating masses.

Therefore, Equation 1 demonstrates that the input acceleration can be calculated by the acceleration controller 204. Referring to the example of FIG. 2, the accelerometer controller 204 further includes optical velocity detector electronics 224 configured to determine the input acceleration based on the angular velocity of the torque-summing gimbal 210 and the linear velocity of the oscillating masses 212. For example, the optical velocity sensors 214 can be arranged as any of a variety of integrated optical system 306 as illustrated in FIG. 3 (e.g., a laser Doppler vibrometer (LDV), a self-mixing laser diode vibrometer, or a fiber-optic Sagnac vibrometer) to determine the velocity (e.g., angular velocity) of the torque-summing gimbal 210 and linear velocity of the oscillating masses 212. The detection is demonstrated in the example of FIG. 2 by optical signals $OPT_{DETION}$ that can be associated with the determination of the velocity (e.g., angular velocity) of the torque-summing gimbal 210 and include the velocity of the oscillating-masses 212. For example, the optical signals $OPT_{DETION}$ can be provided incident on the torque-summing gimbal 210 and/or the oscillating-masses 212 to provide an indication of velocity based on reflection of the optical signals $OPT_{DETION}$ with respect to the optical velocity sensors 214. As a result, the accelerometer controller 204 can calculate the input acceleration based on the velocity of the torque-summing gimbal 210 and the velocity of the oscillating-masses 212.

In addition, the optical velocity sensor 214 can be implemented to provide for self-integration of the determination of the input acceleration. For example, based on the predetermined physical characteristics of the torque-summing gimbal 210, the measured rotation of the torque-summing gimbal 212 can be implemented by the accelerometer controller 204 to calculate the total angular displacement (sum of plus and minus angles for the same polarity of input acceleration) of the torque-summing gimbal 210 about the respective flexures 360. Based on the known changes to the angular displacement of the torque-summing gimbal 210, as determined by the optical velocity sensor 214 in concert with the processing of the accelerometer controller 204, the accelerometer controller 204 can provide for self-integration of the input acceleration acting upon the sensor system 202 (e.g., via the feedback of the oscillating-mass servo 220) based on measuring the total angular displacement of the torque-summing gimbal 210 while compensating for any change in the velocity of the oscillating-masses 212, such as based on the predetermined physical characteristics of the sensor system 202, as well as the linear velocity of the oscillating masses 212 and the angular velocity of the torque-summing gimbal 210. As a result, the CVA system 100, as described herein, can exhibit improved reliability and reduced cost relative to other types of accelerometers (e.g., Pendulous Integrating Gyroscope Accelerometer (PIGA) or Specific Integrating Force Receiver (SIFR). The CVA system 100 can also provide for a greater accuracy based on calculating the input acceleration via determined (e.g., optically determined) velocity characteristics, as opposed to other accelerometers that rely on electrostatic or electromagnetic force-rebalance of the input acceleration. Furthermore, as described herein, the CVA system 100 can also perform angular rate detection and self-integration with little additional firmware manipulation of the accelerometer controller.

Figure 7:
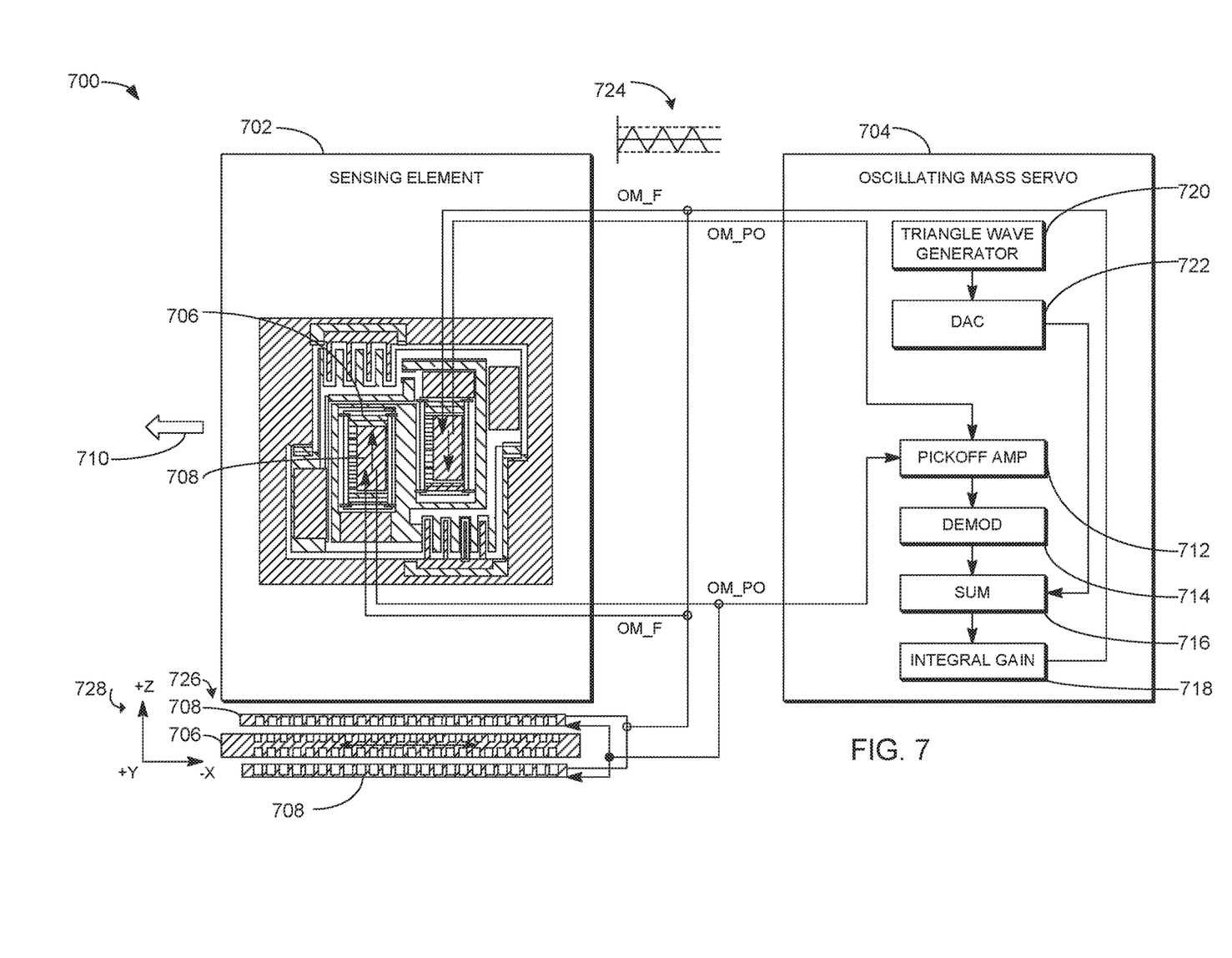
FIG. 7 illustrates an example of an oscillating-mass servo system.

FIG. 7 illustrates an example of an oscillating-mass servo system 700. The oscillating-mass servo system 700 includes a sensing element 702 and an oscillating mass servo 704 that can correspond to the oscillating-mass servo 220 in the example of FIG. 2.

The oscillating-mass servo 704 includes a pickoff amplifier 712, carrier demodulator 714, summing point 716, integral gain 718, triangle wave generator 720, and DAC 722. The pickoff amplifier 712 is coupled to sets of electrodes 708 that interact with the oscillating-masses 706. The oscillating-masses 706 and the sets of electrodes 708 are demonstrated as a "tooth" drive oriented based on a Cartesian coordinate system 730 relative to the Cartesian coordinate system 482 in the example of FIG. 4. The sets of electrodes 706 can correspond to the electrodes 212 in the example of FIG. 2. The integral gain component 718 is configured to provide the forcer signals OM_F to null the pickoff output of the pickoff amplifier 712 having received the pickoff signals OM_PO, demonstrated collectively in the example of FIG. 2 as signals "OM_PO". As an example, the electrodes 708 can correspond to a common set of electrodes for the forcer and pickoff signals OM_F and OM_PO, respectively, or can correspond to dedicated respective sets of electrodes for the forcer and pickoff signals OM_F and OM_PO, respectively. In addition, the oscillating-masses 706 are provided the carrier frequency signal F_CF and +Vdc bias voltage, as described previously in the example of FIG. 2.

The pickoff amplifier 712 can provide the received pickoff signal OM_PO to a carrier demodulator 714 that is configured to demodulate the carrier frequency signal F_CF from the pickoff signal(s) OM_PO. The demodulated pickoff signal OM_PO is provided to a summing component 716. The summing component 716 is configured to add a triangular wave signal, demonstrated at 720, to the demodulated pickoff signal OM_PO. In the example of FIG. 7, the triangular wave signal 724 has an amplitude that is centered on approximately zero. The summing component 716 therefore provides the summed signal to an integral gain component 718 that is configured to provide the integrated forcer signal OM_F signal to the to the electrodes 708 to provide the oscillatory motion of the oscillating-masses 706. In the example of FIG. 7, the triangular wave signal 724 is generated by firmware applied to the DAC 722 that generates the triangular wave signal 724 as having a substantially linear positive and negative slew rate (e.g., equal and opposite) to provide for a substantially constant velocity of the oscillating-masses 706 in the +Y and −Y directions. Therefore, the oscillating-mass servo 704 can provide for feedback control of the oscillatory motion of the oscillating-masses 706 to maintain the substantially constant velocity. Accordingly, because the oscillatory motion of the oscillating-masses 706 is based on a substantially constant slew rate triangular wave signal 724, the oscillating-mass servo 704 can be subjected to substantially less velocity noise due for example to external vibration in operating the associated control loop, and the velocity of the oscillating-mass 252 can be more easily determined for calculation of the input acceleration, as described herein.

Figure 8A:
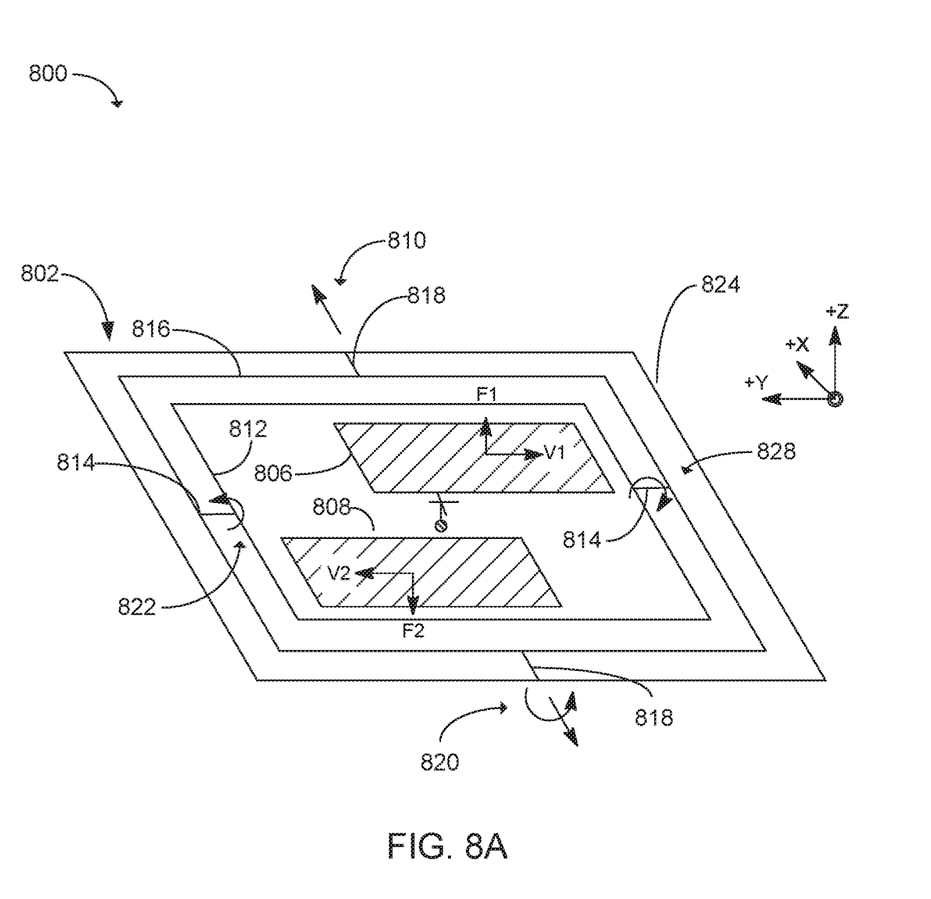
FIGS. 8A and 8B illustrates an example of Coriolis force-rebalance of a sensor system.
Figure 8B:
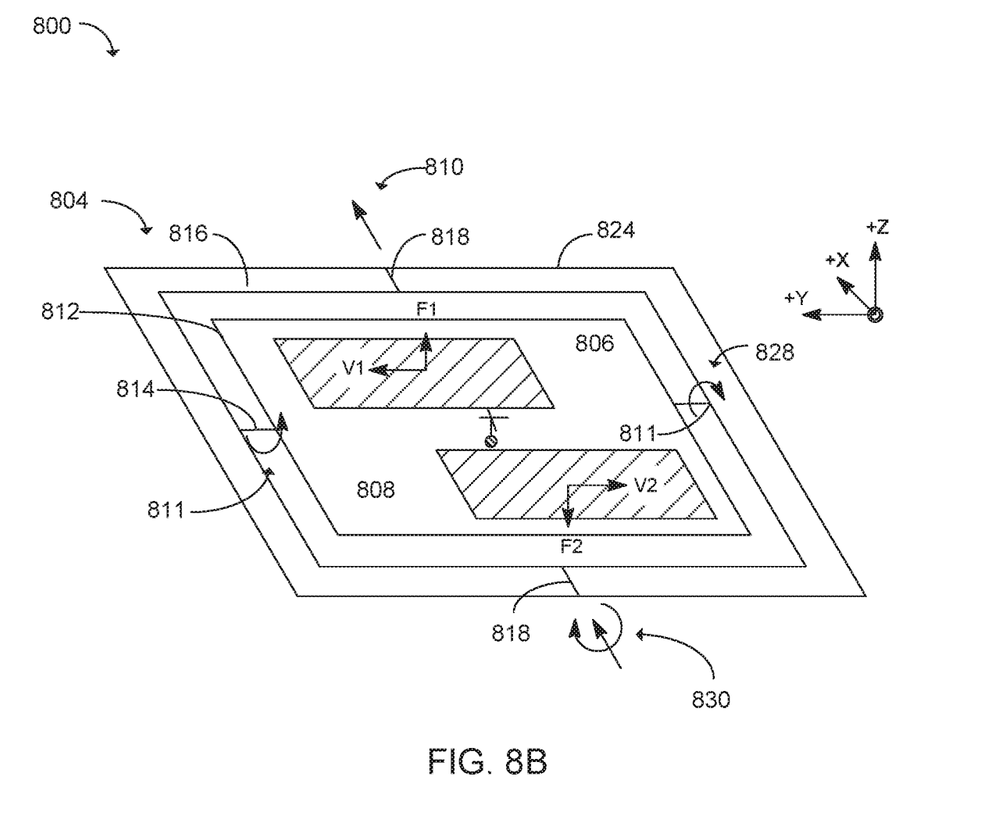

FIGS. 8A and 8B illustrate an example diagram 800 of Coriolis force-rebalance of a sensor system. The diagram 800 includes a first phase 802, illustrated in FIG. 8A, and a second phase 804, illustrated in FIG. 8B, corresponding to respective alternating phases of the in-plane oscillatory motion of the oscillating masses, demonstrated in the example of FIGS. 8A and 8B as oscillating masses 806 and 808. The diagram 800 demonstrates a simplified plan view of the sensor system 202 in each of the phases 802 and 804.

The pendulum is shown to be below the plane of the sensing element in FIGS. 8A and 8B illustrated in diagram 800. The diagram 800 demonstrates an input acceleration 810 in the +X direction, which will result in rotation of the pendulous element, demonstrated at 812, about the +Y-axis via flexures 814. In the first phase 802, the first oscillating mass 806 is moving in the −Y direction at a velocity $V_1$ and the oscillating mass 808 is moving in the +Y direction at a velocity $-V_2$. In response to the pickoff signal PO resulting from the rotation of the pendulous element 812, the acceleration controller 204 can generate a forcer signal FRC that is provided to the electrodes (e.g. associated with the housing), to force the torque-summing gimbal, demonstrated at 816, to rotate about flexures 818.

The rotation of the torque-summing gimbal 816 can be such to provide an angular velocity of the torque-summing gimbal 816 about the −X-axis in a manner that is at the same frequency and in a 180° phase relationship with the in-plane oscillatory motion of the oscillating masses 806 and 808. The phase relationship is determined by the polarity of the pendulous element pickoff. The rotation of the torque-summing gimbal 816 is demonstrated in the first phase 802 at 820 about the flexures 818 and is thus counter-clockwise looking along the +X-axis. As a result of the combination of the in-plane oscillatory motion of the oscillating masses 806 and 808 and the counter-clockwise rotation of the torque-summing gimbal 816 in the first phase 802, a Coriolis acceleration is generated at each of the oscillating masses 806 and 808. The Coriolis acceleration of the oscillating masses generate forces demonstrated in the example of FIG. 8A as $F_1$ in the +Z direction and as $-F_2$ in the −Z direction. The Coriolis forces $F_1$ and $-F_2$ therefore provide a torque-rebalance of the pendulous element 812 to counteract the torque on the pendulous element 812 resulting from the input acceleration 810. The rotation of the pendulous element 812 resulting from the Coriolis torque-rebalance based on the Coriolis forces $F_1$ and $-F_2$ is demonstrated at 828.

In the second phase 804, the first oscillating mass 806 is moving in the +Y direction at a velocity $+V_1$ and the oscillating mass 808 is moving in the −Y direction at a velocity $-V_2$. In response to the pickoff signal PO resulting from the rotation of the pendulous element 812, the acceleration controller 204 can continue to provide the forcer signal FRC that is provided to the electrodes (e.g., associated with the housing), to force the torque-summing gimbal 816 to rotate about flexures 818. In the second phase 804, the rotation of the torque-summing gimbal 816 is reversed like the alternate phase of the in-plane oscillatory motion of the oscillating masses 806 and 808. The rotation of the torque-summing gimbal 816 is demonstrated in the second phase 804 at 830 about the flexures 818 and is thus clockwise looking along the +X-axis. As a result of the combination of the in-plane oscillatory motion of the oscillating masses 806 and 808 and the clockwise rotation of the torque-summing gimbal 816 in the second phase 804, a Coriolis acceleration is generated at each of the oscillating masses 806 and 808, with the resultant forces demonstrated in the example of FIG. 8B as $+F_1$ in the +Z direction and as $-F_2$ in the −Z direction. The Coriolis forces $+F_1$ and $-F_2$ therefore continue to provide the torque-rebalance of the pendulous element 812 to counteract the torque on the pendulous element 812 resulting from the input acceleration 810. The rotation of the pendulous element 812 resulting from the Coriolis torque-rebalance based on the Coriolis forces $+F_1$ and $-F_2$ is demonstrated at 828 in the second phase 804, which is in the same rotational direction as the Coriolis torque-rebalance in the first phase 802.

Figure 9:
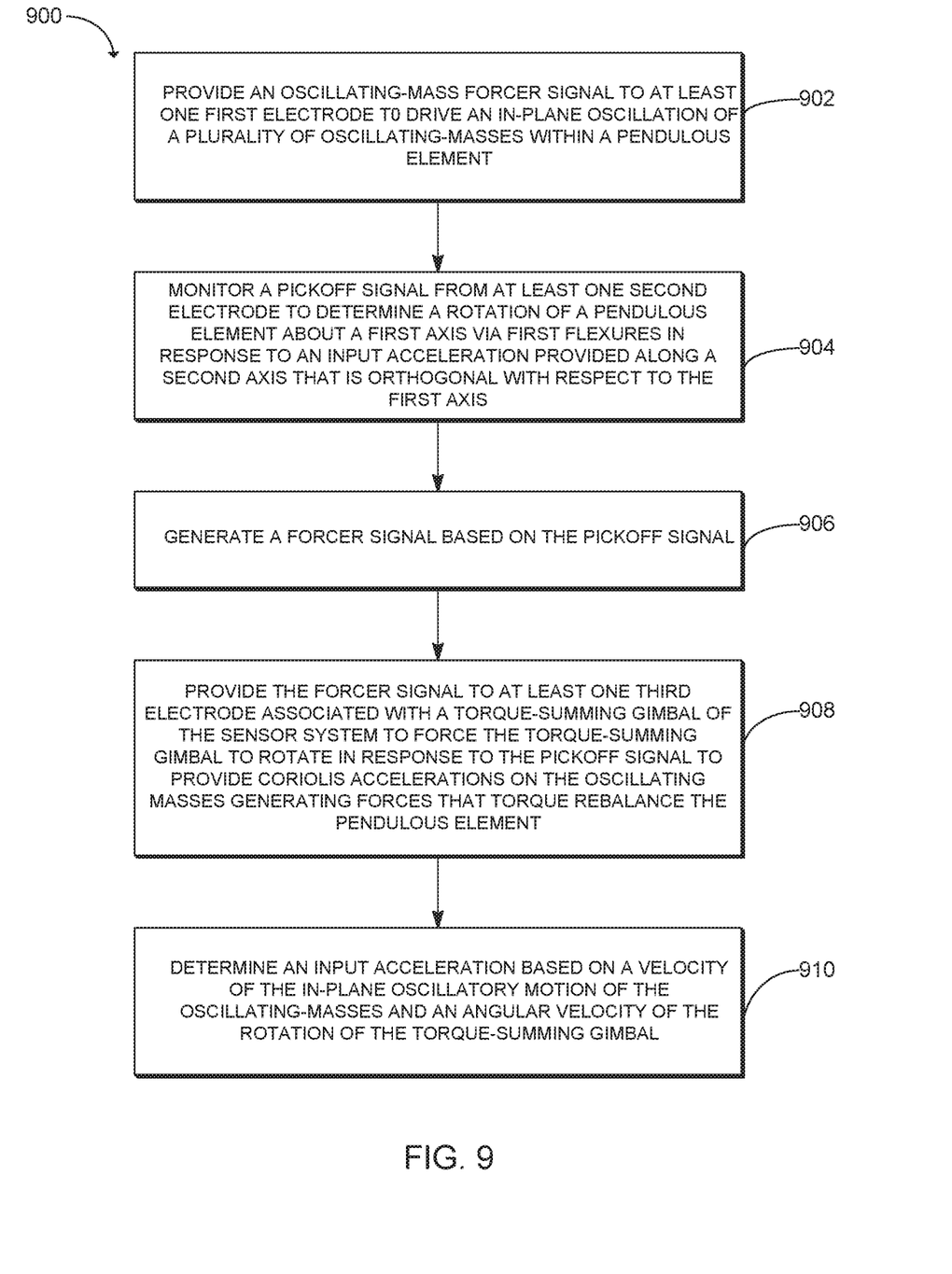
FIG. 9 illustrates an example of a method for measuring rotation about a sensitive axis via a CVA system.

FIG. 9 illustrates an example of a method 900 for measuring an input acceleration along a sensitive axis (e.g., the X-axis) via a CVA system. At 902, an oscillating-mass forcer signal (e.g., the forcer signal OM_F in FIG. 2) is provided to at least one first electrode (e.g., the electrodes 472 in FIG. 4) to drive an in-plane oscillatory motion of a plurality of oscillating-masses (e.g., the oscillating-masses 458). At 904, a pickoff signal (e.g., the pickoff signal PM_PO in FIG. 2) is monitored from at least one second electrode (e.g., the PO/F electrodes 208) to determine a rotation of a pendulous element (e.g., the pendulous element 460 about a first axis (e.g., the Y-axis) via first flexures (e.g., the flexures 468) in response to the input acceleration provided along a second axis (e.g., the X-axis) that is orthogonal with respect to the first axis. At 906, a forcer signal (e.g., the torque-rebalance signal TSG_T) is generated based on the pendulous element pickoff signal. At 908, the forcer signal is provided to at least one third electrode (e.g., the TSG electrodes 210) associated with a torque-summing gimbal (e.g., the torque-summing gimbal 462) to force the torque-summing gimbal to rotate (e.g. oscillate) in response to the pickoff signal to provide Coriolis torque-rebalance of the pendulous element via the oscillatory angular velocity of the torque-summing gimbal and the in-plane oscillatory velocity of the oscillating masses. At 910, an input acceleration is determined based on a velocity of the in-plane oscillatory motion of the oscillating-masses and the oscillatory angular velocity of the rotation of the torque-summing gimbal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A Coriolis Vibratory Accelerometer (CVA) system comprising:
a sensor system comprising a pendulous element configured to rotate about a first axis via first flexures in response to an input acceleration provided along a second axis that is orthogonal with respect to the first axis, the sensor system further comprising a torque-summing gimbal coupled to the pendulous element via the first flexures and coupled to a housing via second flexures; and
an accelerometer controller configured to monitor a pickoff signal associated with the rotation of the pendulous element from at least one first electrode coupled to the pendulous element and to provide a forcer signal to at least one second electrode coupled to the torque-summing gimbal to force the torque-summing gimbal to rotate about the second axis via the second flexures based on the pickoff signal to provide Coriolis force-rebalance of the pendulous element, the accelerometer controller being further configured to determine the input acceleration based on the rotation of the torque-summing gimbal.

2. The system of claim 1, wherein the sensor system further comprises a plurality of oscillating-masses that are driven by an oscillating-mass forcer signal via at least one third electrode to provide in-plane oscillatory motion of the plurality of oscillating-masses, wherein the accelerometer controller is configured to provide the forcer signal to force the torque-summing gimbal to rotate in an oscillatory manner about the second axis at a same frequency as the in-plane oscillatory motion of the plurality of oscillating-masses, such that the in-plane oscillatory motion of the plurality of oscillating-masses and the rotation of the torque-summing gimbal in the oscillatory manner generates a Coriolis force to provide the Coriolis force-rebalance of the pendulous element.

3. The system of claim 2, wherein the oscillating-mass forcer signal is generated by the accelerometer controller as a triangular wave to provide for a substantially constant velocity anti-parallel periodic motion of the plurality of oscillating-masses.

4. The system of claim 2, wherein the at least one first electrode comprises a first planar pair of electrodes coupled to the pendulous element and a first opposing pair of planar electrodes coupled to a housing on a surface opposite a surface of the pendulous element, wherein the at least one second electrode comprises at least one first set of comb-drive electrodes coupled to the torque-summing gimbal and at least one second set of comb-drive electrodes coupled to the housing on each of opposite sides of the housing, with the at least one second set of comb-drive electrodes on each opposite side of the housing being interdigitated with the respective first pair of comb-drive electrodes, wherein the at least one third electrode comprises a first set of tooth-drive electrodes coupled to each of the plurality of oscillating-masses and a second set of tooth-drive electrodes coupled to the housing on a surface opposite a surface of each of the respective plurality of oscillating-masses.

5. The system of claim 2, wherein the accelerometer controller is configured to determine the input acceleration based on a velocity of the plurality of oscillating-masses and based on an angular velocity of the torque-summing gimbal.

6. The system of claim 5, further comprising an optical velocity detector configured to determine the velocity of the plurality of oscillating-masses and to determine the angular velocity of the torque-summing gimbal.

7. The system of claim 1, wherein the second flexures occupy a first plane that includes a center of gravity associated with the sensor system, and wherein the first flexures are offset from the first plane by a predetermined distance to provide pendulosity of the pendulous element in response to the input acceleration in-plane with the first plane and to substantially mitigate pendulosity of the torque-summing gimbal in response to any acceleration in-plane with the first plane.

8. The system of claim 1, wherein the accelerometer controller is further configured to monitor a displacement of the torque-summing gimbal and to provide self-integration of the determination of the input acceleration based on the monitored displacement of the torque-summing gimbal.

9. The system of claim 1, wherein the accelerometer controller comprises an angular rate servo configured to provide a force-rebalance signal to the first set of electrodes in response to the pickoff signal to substantially mitigate errors associated with angular rotation of the pendulous element in response to rotation of the sensor system.

10. The system of claim 9, wherein the angular rate servo is further configured to calculate the rotation of the sensor system based on the amplitude of the force-rebalance signal.

11. A method for measuring an input acceleration along a sensitive axis via a Coriolis Vibratory Accelerometer (CVA) system, the method comprising:
providing an oscillating-mass forcer signal to at least one first electrode to drive an in-plane oscillatory motion of a plurality of oscillating-masses associated with a pendulous element of a sensor system;
monitoring a pickoff signal from at least one second electrode to determine a rotation of the pendulous element about a first axis via first flexures in response to an input acceleration provided along a second axis that is orthogonal with respect to the first axis;
generating a forcer signal based on the pickoff signal;
providing the forcer signal to at least one third electrode associated with a torque-summing gimbal of the sensor system to force the torque-summing gimbal to rotate in response to the pickoff signal to provide Coriolis force-rebalance of the pendulous element via the rotation of the torque-summing gimbal and the in-plane oscillatory motion of the oscillating-masses; and
determining an input acceleration based on a velocity of the in-plane oscillatory motion of the oscillating-masses and an angular velocity of the rotation of the torque-summing gimbal.

12. The method of claim 11, further comprising generating the oscillating-mass forcer signal as a triangular wave to provide for a substantially constant velocity motion of the plurality of oscillating-masses.

13. The method of claim 11, further comprising determining the velocity of the in-plane oscillatory motion of the oscillating-masses and determining the angular velocity of the rotation of the torque-summing gimbal via an optical detection system.

14. The method of claim 11, further comprising:
determining a displacement of the torque-summing gimbal in response to rotation of the torque-summing gimbal; and
integrating the determination of the input acceleration based on the monitored displacement of the torque-summing gimbal.

15. The method of claim 11, further comprising:
generating an angular rate force-rebalance signal in response to the pickoff signal;
providing the angular rate force-rebalance signal to the at least one second electrode to substantially mitigate errors in the determination of the input acceleration based on angular rotation of the pendulous element in response to rotation of the sensor system; and
calculating an angular rate of the rotation of the sensor system based on the amplitude and polarity of the angular rate force-rebalance signal.

16. A Coriolis Vibratory Accelerometer (CVA) system comprising:
a sensor system comprising:
a pendulous element configured to rotate about a first axis via first flexures in response to an input acceleration provided along a second axis that is orthogonal with respect to the first axis;
a plurality of oscillating-masses coupled to the pendulous element via second flexures and being configured to oscillate in an in-plane oscillatory motion; and
a torque-summing gimbal coupled to the pendulous element via the first flexures and coupled to a housing via third flexures; and
an accelerometer controller comprising:
an oscillating-mass servo configured to provide an oscillating-mass forcer signal to at least one first electrode associated with the plurality of oscillating-masses to provide the in-plane oscillatory motion;
an angular rate servo configured to monitor a pickoff signal associated with the rotation of the pendulous element from at least one second electrode coupled to the pendulous element;
an acceleration rebalance servo configured to provide a forcer signal to at least one third electrode coupled to the torque-summing gimbal to force the torque-summing gimbal to rotate about the third flexures based on the pickoff signal to provide Coriolis force-rebalance of the pendulous element in response to the rotation of the torque-summing and the in-plane oscillatory motion of the oscillating masses; and
an optical velocity detector configured to determine a velocity of the plurality of oscillating-masses and to determine an angular velocity of the torque-summing gimbal, the acceleration controller being configured to determine the input acceleration based on the velocity of the plurality of oscillating-masses and the angular velocity of the torque-summing gimbal.

17. The system of claim 16, wherein the oscillating-mass forcer signal is generated by the oscillating-mass servo as a triangular wave to provide for a substantially constant velocity motion of the plurality of oscillating-masses.

18. The system of claim 16, wherein the optical velocity detector is further configured to monitor a displacement of the torque-summing gimbal and to provide self-integration of the determination of the input acceleration via the acceleration controller based on the monitored displacement of the torque-summing gimbal.

19. The system of claim 16, wherein the angular rate servo is further configured to provide an angular rate force-rebalance signal to the first set of electrodes in response to the pickoff signal to substantially mitigate errors associated with angular rotation of the pendulous element in response to rotation of the sensor controller, wherein the acceleration controller is further configured to calculate the rotation of the sensor controller based on the amplitude of the angular rate force-rebalance signal.

20. The system of claim 16, wherein the second flexures occupy a first plane that includes a center of gravity associated with the sensor system, and wherein the first flexures are offset from the first plane by a predetermined distance to provide pendulosity of the pendulous element in response to the input acceleration in-plane with the first plane and to substantially mitigate pendulosity of the torque-summing gimbal in response to any acceleration in-plane with the first plane.

* * * * *